United States Patent [19] [11] 4,262,532
Butler et al. [45] Apr. 21, 1981

[54] PRESSURE AND TEMPERATURE SENSOR

[75] Inventors: Walter J. Butler; Miran Milkovic, both of Scotia, N.Y.

[73] Assignee: General Electric Company, Schenectady, N.Y.

[21] Appl. No.: 75,254

[22] Filed: Sep. 13, 1979

[51] Int. Cl.³ .......................... G01L 9/12; G01K 7/22; H01C 7/22
[52] U.S. Cl. ........................................ 73/345; 73/717; 338/25; 361/280
[58] Field of Search ................... 73/345, 362.4, 708, 73/714, 718, 724, 717; 361/283, 280, 382; 338/25

[56] References Cited

U.S. PATENT DOCUMENTS

| 3,064,222 | 11/1962 | Renier | 73/362 AR X |
| 3,328,653 | 6/1967 | Wolf, Jr. | 73/724 X |
| 3,371,295 | 2/1968 | Bourgault et al. | 333/172 |
| 3,439,356 | 4/1969 | Kinzer | 73/345 X |
| 3,715,638 | 2/1973 | Polye | 338/25 |
| 3,808,480 | 4/1974 | Johnston | 73/708 X |
| 3,926,053 | 12/1975 | Schurrer et al. | 73/351 |
| 4,028,943 | 6/1977 | Hyanova et al. | 73/345 |
| 4,084,438 | 4/1978 | Lee et al. | 361/283 X |
| 4,129,848 | 12/1978 | Frank et al. | 73/362 AR X |
| 4,158,217 | 6/1979 | Bell | 73/718 X |

FOREIGN PATENT DOCUMENTS 295998 2/1971 U.S.S.R. ................................... 73/345

Primary Examiner—Daniel M. Yasich
Attorney, Agent, or Firm—Geoffrey H. Krauss; James C. Davis; Marvin Snyder

[57] ABSTRACT

A hybrid sensor for simultaneously sensing pressure and temperature in non-interacting manner, includes an insulative substrate having a temperature-sensitive printed thick film resistor fabricated thereon. A conductive plate is insulatively spaced above the resistor and supported by a pressure-tight insulative barrier. The distributed capacitance between the plate and the resistive pattern is a function of the pressure applied to the exterior face of the plate, while the resistance of the resistive thick film is a function of temperature of the surrounding environment.

9 Claims, 4 Drawing Figures

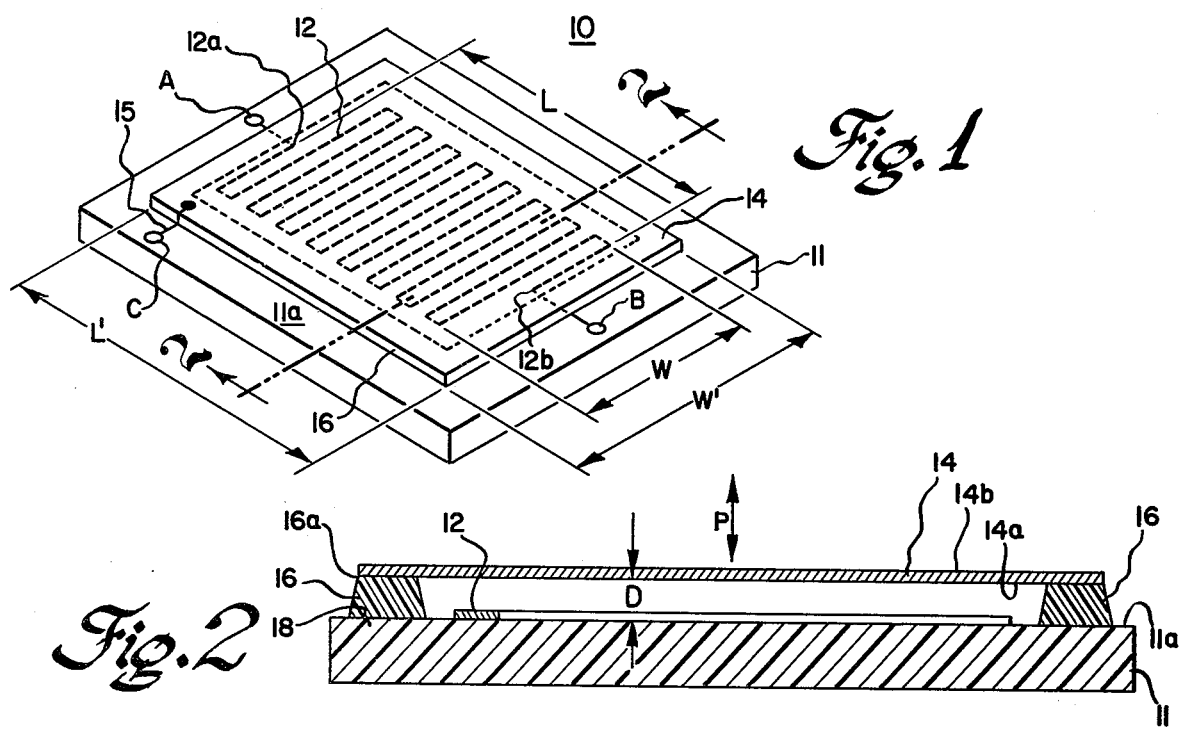
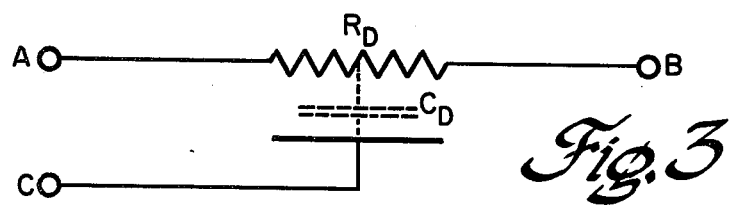
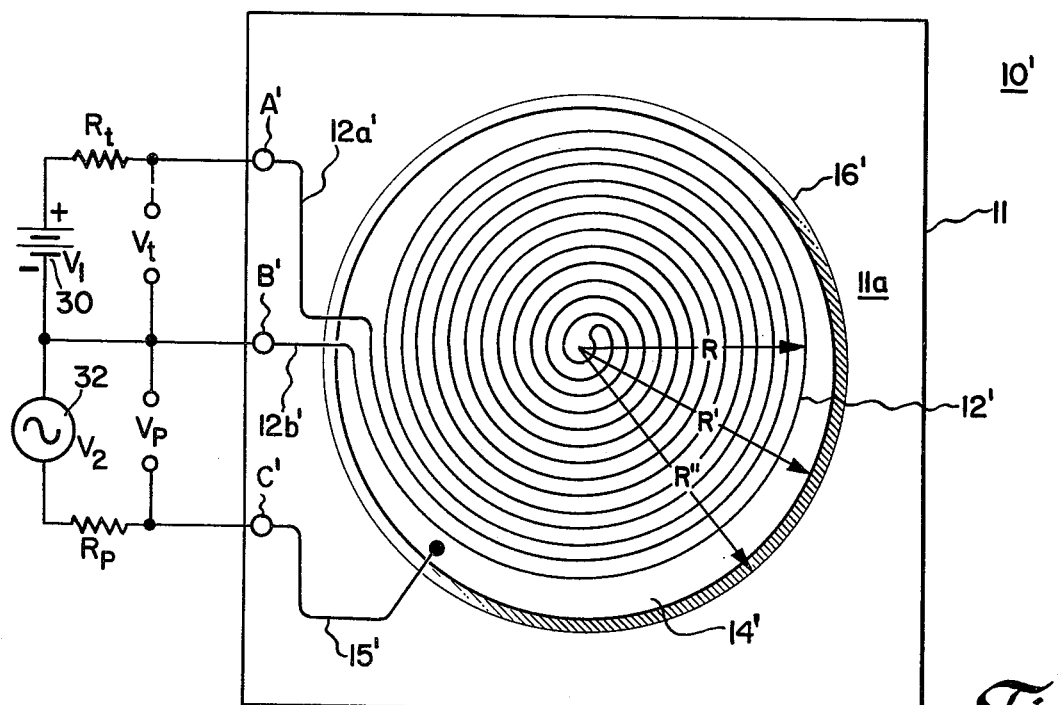

PRESSURE AND TEMPERATURE SENSOR

BACKGROUND OF THE INVENTION

The present invention relates to pressure and temperature sensors and, more particularly, to a novel hybrid pressure and temperature sensor for simultaneously sensing pressure and temperature at a single location and in non-interacting manner.

In many forms of apparatus, such as in heat pumps and the like appliances, it is necessary to simultaneously sense pressure and temperature at a particular location. Previously, such parameter sensing has been carried out by the use of a pair of sensors at each sensed location. This arrangement is not only relatively costly, but, as the two transducers are not located at exactly the same physical location within the apparatus, also does not provide simultaneous indication of pressure and temperature at exactly the same sensed location. It is desirable to not only sense both pressure and temperature at the same location, in essentially non-interacting manner, but to also sense both parameters with a single sensor having relatively low cost and a minimum parts count.

BRIEF SUMMARY OF THE INVENTION

In accordance with the invention, a sensor for simultaneously sensing pressure and temperature at a single location in substantially non-interacting manner, includes an insulative substrate having a patterned thick film resistance element fabricated thereon between first and second terminals, and a conductive plate insulatively spaced from the resistive thick film pattern and connected to a third terminal. A pressure-tight support of insulative material is fabricated between the periphery of the conductive plate surface closest to the substrate and the substrate surface, to provide an interior compartment, in which the thick film resistor is enclosed, at a reference pressure, which may be substantially a vacuum. The sensor is positioned at the location at which pressure and temperature are to be sensed and pressure thereat exerts a force upon the exterior surface of the conductive plate, varying the spacing between the plate and the resistive thick film to vary the distributed capacitance therebetween as a function of ambient external pressure, substantially independent of ambient temperature. The ambient temperature changes the amount of heat energy to vary the resistivity of the thick film resistor with temperature, substantially independent of ambient pressure.

In a preferred embodiment, the substrate is formed of alumina while the printed thick film resistor is formed in a meander or spiral pattern.

Accordingly, it is an object of the present invention to provide a novel sensor for simultaneously sensing pressure and temperature at a single location in substantially non-interacting manner.

This and other objects of the present invention will become apparent upon consideration of the following detailed description, when taken in conjunction with the drawings.

BRIEF DESCRIPTION OF THE DRAWINGS

FIG. 1 is a prospective view of a first preferred embodiment of the novel pressure and temperature sensor of the present invention;

FIG. 2 is a sectional view of the sensor of FIG. 1, taken along line 2—2;

FIG. 3 is a schematic diagram of equivalent circuit of the novel pressurance temperature sensor, and useful in understanding the principles of operation thereof; and FIG. 4 is a plan view of another preferred embodiment of the novel pressure and temperature sensor, and of circuitry with which the sensor may be utilized.

DETAILED DESCRIPTION OF THE INVENTION

Referring initially to FIGS. 1, 2 and 3, in one preferred embodiment of our novel pressure and temperature sensor 10, an insulative substrate 11, of alumina and the like insulative materials, has a resistance member 12 fabricated upon one surface 11a thereof. Resistor 12 is advantageously a pattern of thick-film resistance material placed upon surface 11a by printing and the like processes. As best seen in FIG. 1, one presently preferred embodiment of resistance member 12 is a meander-line pattern covering a desired area of length L and width W. The total length and line width, as well as the line thickness, of the resistance film of member 12 is predeterminately selected, along with the resistivity of the resistance material, to provide a desired resistance between the opposed ends 12a and 12b of the resistance element. Ends 12a and 12b are each respectively connected to one of a pair of electrical contacts A and B formed upon substrate surface 11a. A distributed resistance $R_D$ is thus formed between contact terminals A and B and the resistance thereof is a function of the temperature at which the resistance material of resistor element 12 is maintained; the change of resistance, between terminals A and B, with temperature is predeterminately chosen by selection of the resistance material.

A thin conductive electrode plate 14, which may be of planar configuration, is insulatively supported above substrate surface 11a to provide a distributed capacitance $C_D$ between electrode 14 and resistance element 12 (and each of the contact terminals A and B associated therewith). Electrode 14 is connected by a lead 15 to an associated contact terminal C (also positioned upon substrate surface 11a). Electrode 14 has a length L', greater than the length L of the resistance pattern, and a width W', greater than the width W of the resistance pattern, to facilitate positioning of a support member 16 between the periphery of the electrode surface 14a, closest to the substrate, and the substrate surface 11a. Support 16 is formed of an insulative material and is fabricated in such manner as to form a pressure-tight seal, along line 18, with substrate surface 11a. The material of support 16 also butts with, and forms a pressure-tight seal over, the ends 12a and 12b of the resistance member pattern. After fabrication of supporting rim 16, conductive electrode 14 is positioned upon the rim surface 16a from the substrate and the periphery of electrode surface 14b is joined thereto in pressure-tight manner. The volume defined by substrate surface 11a, the interior walls of support rim 16 and electrode surface 14a, contains a quality of a dielectric material, which may be vacuum, air, and the like dielectric materials, introduced during fabrication and serving as the capacitor dielectric. Electrode 14 acts as a diaphragm deforming responsive to ambient pressure P, at electrode surface 14b, urging the electrode toward, and away from, resistance member 12 with greater, or lesser, pressure and increasing, or decreasing, the capacitance between terminal C and each of resistance element terminals A and B. The distance D between the interior electrode surface 14a and substrate surface 11a is predeterminately established, by selecting the height of rim portion 16, to provide a preselected capacitance value at a reference pressure. Thus, ambient pressure external to the sensor is sensed by variation of distributed capacitance $C_D$, while ambient temperature affects the amount of thermal energy received by resistance member 12 within the pressure-tight compartment. Deformation of electrode 14, by proper choice of the conductive material and dimensions and shape thereof, is essentially unaffected by the temperature external to sensor 10.

Referring now to FIG. 4, another preferred embodiment 10' of our novel pressure and temperature sensor also includes an insulative substrate 11 upon a surface 11a of which a resistor member 12' is fabricated. In this embodiment, resistor member 12' is fabricated as a dual spiral of resistance material with the opposite ends 12a' and 12b' of the resistance element connected to contact terminals A' and B', which may be advantageously positioned adjacent one edge of the substrate. An annular support member 16' is fabricated upon substrate surface 11a, with an interior radius R' greater than the maximum radius R of the resistant element spiral. Annular support rim 16' is joined to substrate top surface 11a to form a pressure-tight seal therebetween. A pressure-tight seal is also formed where rim 16' passes over end portions of resistance member 12'. A circular conductive electrode member 14' is placed on top of annular support rim 16' and has a maximum radius R", greater than the inner radius R' of support rim 16'. The periphery of the underside of the electrode is sealed to the top of the support rim in pressure-tight manner, whereby a somewhat cylindrical chamber, bounded by substrate surface of electrode 14' closest to the substrate, encloses the spiraled resistance member 12'' and a dielectric medium at some reference pressure. Substantially circular electrode 14' is connected to a third contact terminal C' by lead 15', which may be fabricated as a conductive film upon the exterior surface of support rim 16' and substrate top surface 11a.

In operation, a source 30 of D.C. potential of magnitude $V_1$ is coupled in series with a resistor $R_t$ between temperature-sensing terminals A' and B'. The distributed resistance $R_D$, between terminals A' and B', forms a voltage divider with resistance $R_t$. A voltage $V_t$ appearing between contact terminals A' and B' is a function of the magnitude of D.C. voltage $V_1$, the resistance of resistor $R_t$ and the temperature-sensitive distributed resistance $R_D$ of the sensor. The increase of distributed resistance $R_D$ with temperature will cause an increase in the temperature-sensing output voltage $V_t$. A source 32 of A.C. voltage of magnitude $V_2$ is connected in series with a fixed resistance $R_p$ between the capacitive electrode contact terminal C' and one of the distributed resistance contact terminals A' and B'. Illustratively, contact terminal B' acts as the common terminal between the temperature sensing circuitry of source 30 and resistance $R_t$, and the pressure-sensing circuitry of source 32 and resistance $R_p$. A voltage $V_p$ appears between common terminal B' and capacitive electrode contact terminal C' with the same frequency as that of source 32, and with an amplitude established by the source magnitude $V_2$, the resistance of resistor $R_p$ and the pressure-sensitive magnitude of distributed capacitance $C_D$. An increase in ambient pressure will move electrode 14' closer to the resistance element, whereby the capacitance between terminals C' and B' will increase, thereby decreasing the magnitude of the pressure-sensing voltage $V_p$. Advantageously, the potential sources 30 and 32 and the series resistors $R_t$ and $R_p$ are located in a temperature-stable and pressure-stable environment, whereby the changing magnitude of the pressure and temperature, to be simultaneously measured at the location of sensor 10', is not present at the location of the sources and series resistors and does not affect the magnitudes thereof. The magnitudes of output voltages $V_t$ and $V_p$ are then affected only by the respective temperature and pressure to be simultaneously measured. The output voltages $V_t$ and $V_p$ are analog voltages, which may, in manner known to the art, be converted to digital signals, using analog-to-digital converters, voltage-to-frequency converters and the like. The digital signals may be processed by microcomputers and the like, or the analog signals themselves may be processed by suitable analog processing circuitry (not shown) for adjusting the apparatus, in which the pressure and temperature sensor is located, in accordance with the simultaneous pressure and temperature readings achieved by the sensor in substantially non-interacting manner.

While the present invention has been described with respect to several presently preferred embodiments thereof, many modifications and variations will occur to those skilled in the art. It is our intent, therefore, to be limited only by the scope of the appending claims and not by the specific details recited herein.

What is claimed:

1. A sensor for simultaneously sensing temperature and pressure at a single location and in substantially non-interacting manner, comprising:
   a substrate of an insulative material, said substrate having a surface;
   a resistance member fabricated upon said substrate surface, said resistance member having first and second ends between which an electrical resistance is measurable;
   a single flexible conductive electrode spaced from said resistance member and said substrate surface;
   an insulative support rim extending from said substrate surface to the periphery of a surface of said conductive electrode nearest to said substrate, said substrate rim joined to said substrate surface and to only the periphery of said electrode to form a pressure-tight cavity enclosing said resistance member; and
   a dielectric material enclosed within said cavity and at a reference pressure;
   said resistance member being formed of a resistance material responsive to changes in external temperature for continuously varying the electrical resistance between said resistance member ends; said conductive electrode responsive to changes in external pressure for continuously varying the distributed electrical capacitance between said electrode and said resistance member.

2. The sensor of claim 1, wherein the substrate is formed of alumina.

3. The sensor of claim 1, wherein the resistance member is fabricated of a thick-film resistance material.

4. The sensor of claim 3, wherein said resistance member is formed in a meander-line configuration.

5. The sensor of claim 3, wherein the resistance member is formed as a dual-spiral pattern.

6. The sensor of claim 5, wherein the dual-spiral resistance member has a maximum radius R; said electrode is substantially circular and of radius R" greater than R;

and said support rim is of annular shape with an inner radius R' greater than R and less than R".

7. A sensor for simultaneously sensing temperature and pressure at a single location and in substantially non-interacting manner, comprising:
- a substrate of an insulating material, said substrate having a surface;
- a resistance member fabricated of a thick-film resistance material upon said substrate surface, said resistance member having a meander-line configuration with first and second ends between which an electrical resistance is measurable; the meander-line resistance member covering an area of length L and width W;
- a flexible conductive electrode spaced from said resistance member and said substrate surface; said electrode being of substantially rectangular shape and having a length L' greater than length L and a width W' greater than width W;
- an insulated support rim extending from said substrate surface to the periphery of a surface of said conducting electrode nearest to said substrate, said support rim having length and width inner dimensions respectively greater than L and W and less than L' and W' and joined to said substrate surface and said electrode to form a pressure-tight cavity enclosing said resistance member; and
- a dielectric material enclosed within said cavity and at a reference pressure;
- said resistance member being formed of a resistance material responsive to changes in external temperature for varying the electrical resistance between said resistance member ends; said conductive electrode responsive to changes in external pressure for varying the distributed electrical capacitance between said electrode and said resistance member.

8. In combination, a sensor for simultaneously sensing temperature and pressure at a single location and in substantially non-interacting manner, comprising:
- a substrate of an insulative material, said substrate having a surface;
- a resistance member fabricated upon said substrate surface, said resistance member having first and second ends between which an electrical resistance is measurable;
- a flexible conductive electrode spaced from said resistance member and said substrate surface;
- an insulative support rim extending from said substrate surface to the periphery of a surface of said conductive electrode nearest to said substrate, said substrate rim joined to said substrate surface and to said electrode periphery to form a pressure-tight cavity enclosing said resistance member; and
- a dielectric material enclosed within said cavity and at a reference pressure;
- said resistance member being formed of a resistance material responsive to changes in external temperature for varying the electrical resistance between said resistance member ends; said conductive electrode responsive to changes in external pressure for varying the distributed electrical capacitance between said electrode and said resistance member;
- a source of a D.C. potential, said source having a first terminal connected to one of the resistance member ends and a second terminal;
- a first fixed resistance connected between said D.C. source second terminal and the remaining one of said resistance member ends;
- a source of an A.C. potential, said source having a first terminal connected to said one of the resistance member ends and a second terminal; and
- a second fixed resistance connected between said A.C. source second terminal and said electrode.

9. The sensor combination of claim 8, wherein said D.C. and A.C. sources and said first and second fixed resistances are at a location removed from the location of said sensor.

* * * * *